United States Patent
Hsu et al.

(10) Patent No.: US 8,834,135 B2
(45) Date of Patent: Sep. 16, 2014

(54) HEAT-DISSIPATION FAN

(75) Inventors: Wen-Lin Hsu, Pingtung County (TW); Fu-Jung Ou, Pingtung County (TW); Cheng-Chun Chou, Pingtung County (TW); Chin-Ho Tsai, Pingtung County (TW)

(73) Assignee: ADDA Corp., Pingtung, Pingtung County (TW)

(*) Notice: Subject to any disclaimer, the term of this patent is extended or adjusted under 35 U.S.C. 154(b) by 190 days.

(21) Appl. No.: 13/409,459

(22) Filed: Mar. 1, 2012

(65) Prior Publication Data
US 2012/0308417 A1   Dec. 6, 2012

(30) Foreign Application Priority Data
May 30, 2011 (TW) .............................. 100209755 A

(51) Int. Cl.
| | |
|---|---|
| *F04D 25/08* | (2006.01) |
| *F04D 25/06* | (2006.01) |
| *G06F 1/20* | (2006.01) |
| *F04D 29/64* | (2006.01) |
| *F04D 29/051* | (2006.01) |

(52) U.S. Cl.
CPC .............. *F04D 25/062* (2013.01); *G06F 1/203* (2013.01); *F04D 29/646* (2013.01); *F04D 29/051* (2013.01)

USPC ..................... 417/353; 417/423.7; 417/423.14

(58) Field of Classification Search
CPC ... F04D 25/08; F04D 19/002; F04D 25/0613; F04D 17/16
USPC ................. 417/352, 353, 354, 423.14, 423.7; 310/268
See application file for complete search history.

(56) References Cited

U.S. PATENT DOCUMENTS

2007/0048125 A1*  3/2007  Chou ............................. 415/123
2009/0196770 A1*  8/2009  Yu et al. ........................ 417/353

* cited by examiner

Primary Examiner — Bryan Lettman
(74) Attorney, Agent, or Firm — Jackson IPG PLLC

(57) ABSTRACT

A heat-dissipation fan comprises a hollow cylinder body, a fixing pillar, a stator, a fan wheel, a bearing and bearing plate. The fixing pillar comprises a free end and a fixing end fixed at the hollow cylinder body. The stator is installed at the hollow cylinder body being installed at the bearing plate. The fan wheel comprises a top plate, an outer ring wall, an inner ring wall and a penetration hole formed at the top plate. The inner ring wall surrounds the penetration hole, the hollow cylinder body and the stator are located between the outer ring wall and the inner ring wall, and the bearing is coupled to the inner ring wall. The free end of the fixing pillar is protruded to a top surface of the top plate, which results a supporting surface and the top surface being spaced apart by a first spacing.

19 Claims, 7 Drawing Sheets

HEAT-DISSIPATION FAN

FIELD OF THE INVENTION

The present invention is generally related to a heat-dissipation fan, which particularly relates to the heat-dissipation fan having an anti-crash spacing for crash prevention of a fan wheel of electrical goods being compressed by a case.

BACKGROUND OF THE INVENTION

A conventional heat-dissipation fan 10 is installed within electrical goods 20 such as a notebook or a tablet PC for purpose of heat dissipation as indicated in FIG. 7. However, the novel design of notebooks or tablet PCs emphasize a trend in thinner and lighter. While the heat-dissipation fan 10 being mounted in the electrical goods 20, a fan wheel 11 of said heat-dissipation fan 10 may be compressed by compression of a case 21, keyboard, or panel from beating or pressing of a user, which results destruction on said heat-dissipation fan 10 and fails to operate normally.

SUMMARY

The primary object of the present invention is to provide a heat-dissipation fan comprising a hollow cylinder body, a fixing pillar, a stator, a fan wheel, a bearing and a bearing plate. The hollow cylinder body comprises a bottom plate and a ring wall disposed around the bottom plate, wherein an accommodating space is located between the ring wall and the bottom plate. The fixing pillar comprises a fixing end fixed at the bottom plate of the hollow cylinder body and a free end protruded to the ring wall, wherein the free end comprises a supporting surface. The stator is installed at outer edge of the ring wall. The fan wheel comprises a top plate, an outer ring wall, an inner ring wall, a penetration hole formed at the top plate and a ring-shaped magnet. The top plate comprises a bottom surface and a top surface. The outer ring wall is disposed at the bottom surface of the top plate and comprises a first accommodating slot formed between the outer ring wall and the top plate. The inner ring wall is disposed at the bottom surface of the top plate and comprises a second accommodating slot formed between the inner ring wall and the top plate. The inner ring wall is located within the first accommodating slot and surrounds the penetration hole. The hollow cylinder body and the stator are covered with the fan wheel, and the inner ring wall is fitted into the accommodating space of the hollow cylinder body. The ring wall and the stator are located between the outer ring wall and the inner ring wall. The bearing is disposed within the second accommodating slot and comprises a coupling hole. The fixing pillar penetrates through the coupling hole and the penetration hole of the fan wheel, and the free end of the fixing pillar is protruded to the top surface of the top plate. The supporting surface and the top surface are spaced apart from each other by a first spacing. The bearing plate comprises an insertion hole, and the hollow cylinder body is fixed at the insertion hole. When the heat-dissipation fan is disposed within a notebook or a tablet PC, the free end of the fixing pillar may prevent a case, a keyboard or a panel of electrical goods from compressing the top plate and the fan blades of the fan wheel. Therefore, a fail operation for the heat-dissipation fan can be avoidable.

DETAILED DESCRIPTION OF THE INVENTION

Figure 1:
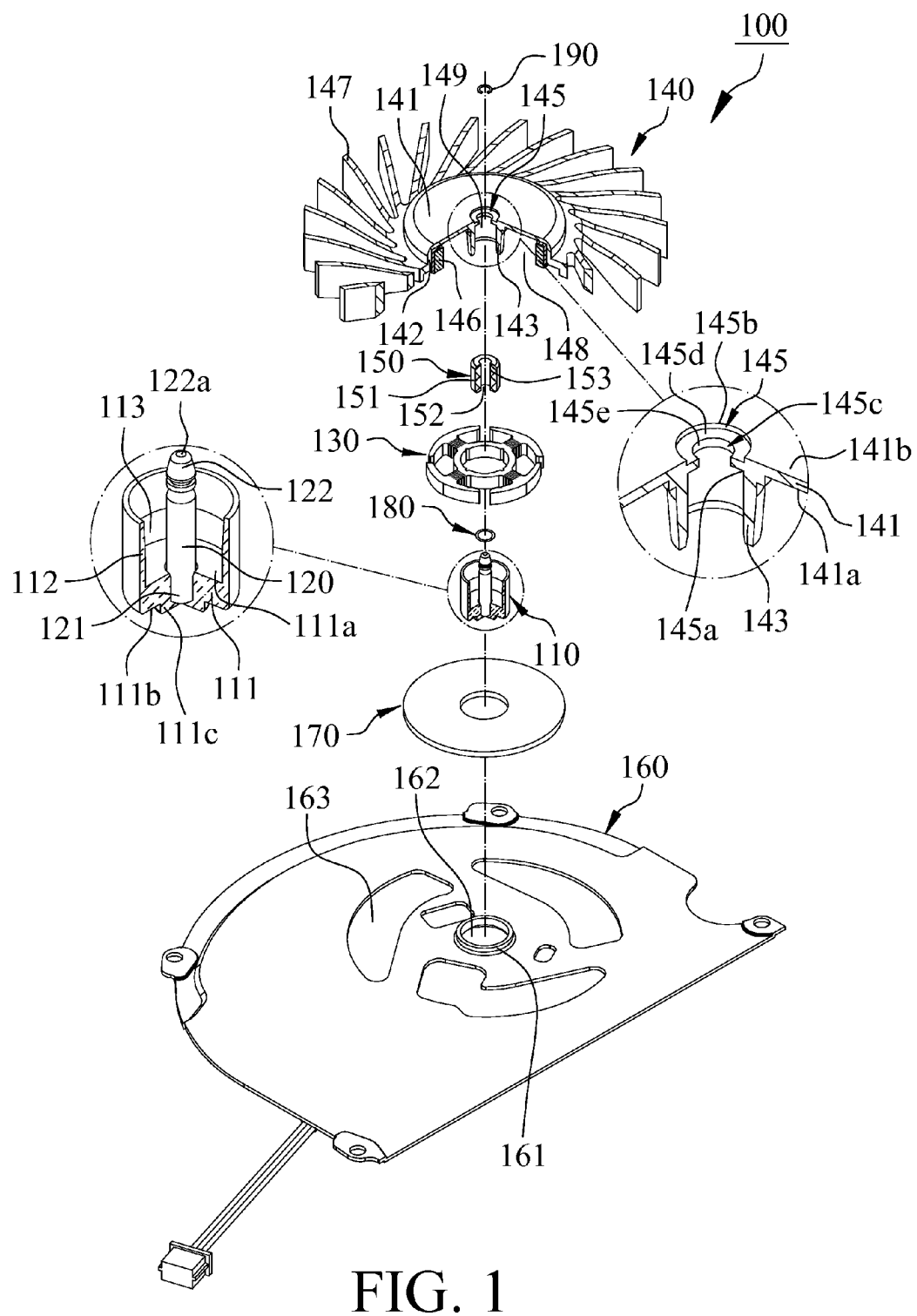
FIG. 1 is a perspective exploded diagram illustrating a heat-dissipation fan in accordance with a first embodiment of the present invention.
Figure 2:
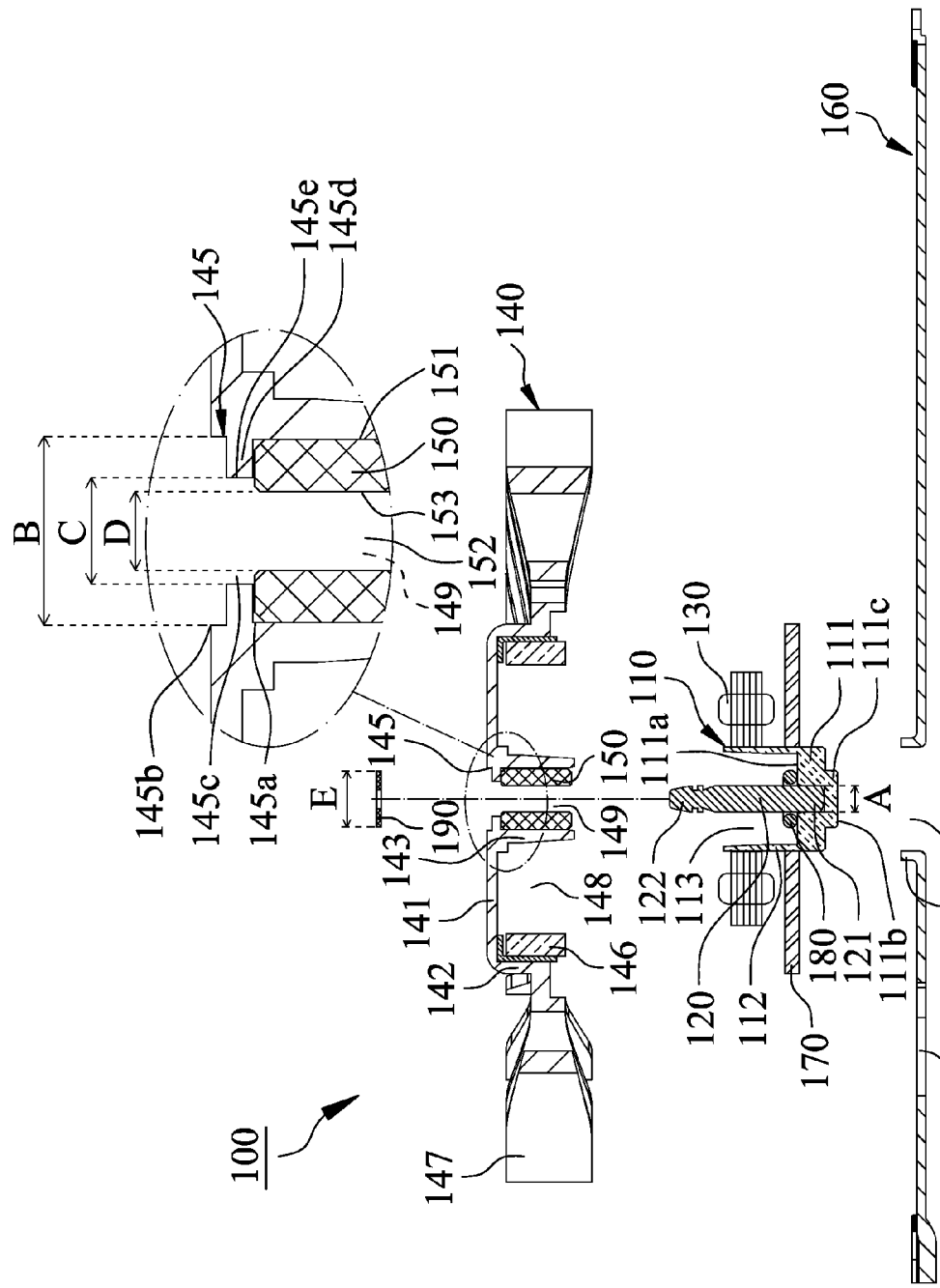
FIG. 2 is a sectioning exploded diagram illustrating a heat-dissipation fan in accordance with a first embodiment of the present invention.
Figure 3:
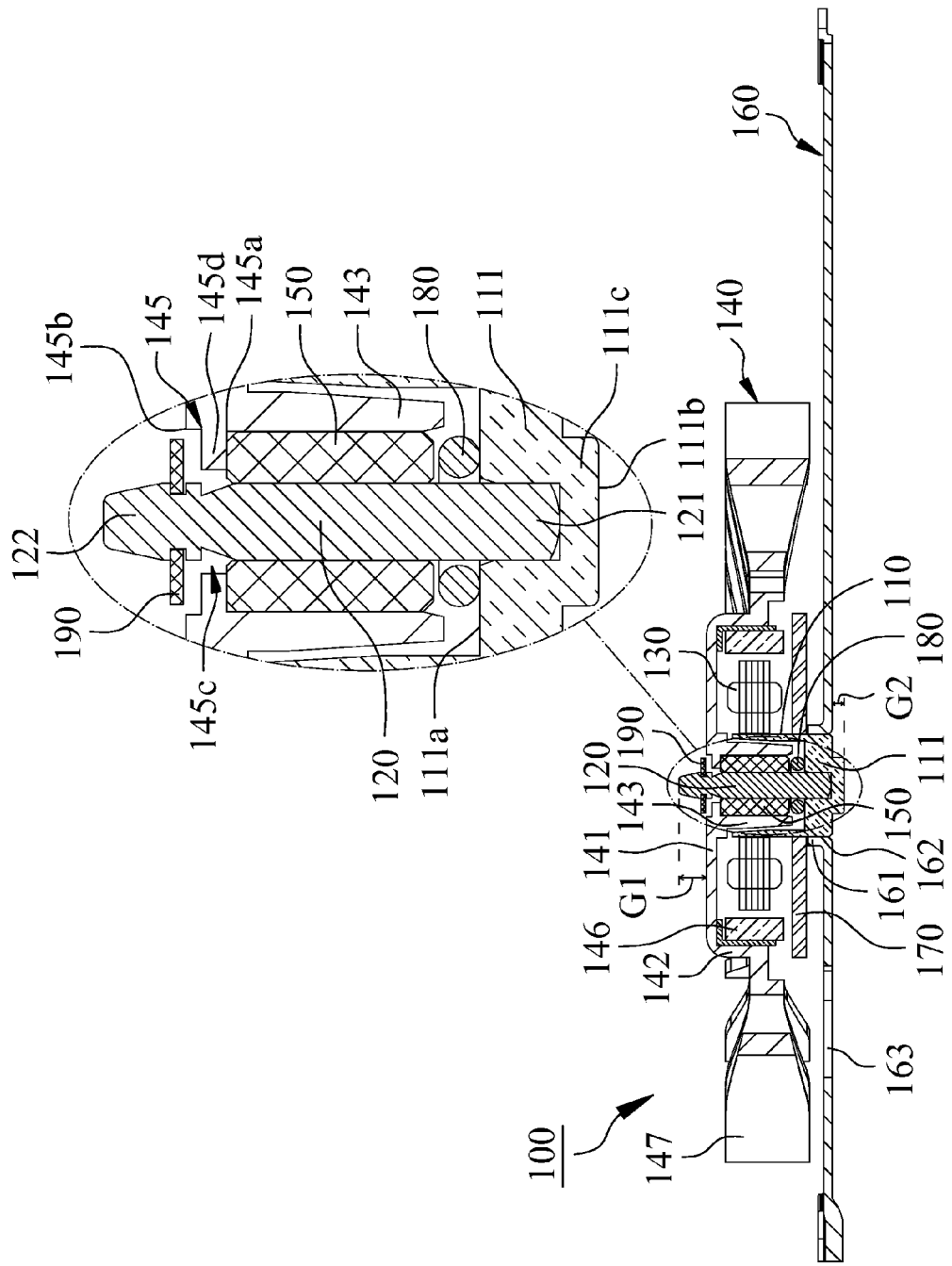
FIG. 3 is a section view illustrating a heat-dissipation fan in accordance with a first embodiment of the present invention.

With reference to FIGS. 1, 2 and 3, a heat-dissipation fan 100 in accordance with a first preferred embodiment of the present invention comprises a hollow cylinder body 110, a fixing pillar 120, a stator 130, a fan wheel 140, a bearing 150, a bearing plate 160 and a circuit board 170. The hollow cylinder body 110 comprises a bottom plate 111, a ring wall 112 and an accommodating space 113 formed between the ring wall 112 and the bottom plate 111. The bottom plate 111 comprises an upper surface 111a and a lower surface 111b, and the ring wall 112 is disposed at the upper surface 111a of the bottom plate 111. The fixing pillar 120 disposed at the hollow cylinder body 110 comprises a fixing end 121, a free end 122 and an outer diameter A, with reference to FIG. 2, the fixing pillar 120 is fixed at the bottom plate 111 of the hollow cylinder body 110 via the fixing end 121. The free end 122 of the fixing pillar 120 is protruded to the ring wall 112 of the hollow cylinder body 110 and comprises a supporting surface 122a. The stator 130 is installed at external edge of the ring wall 112. The fan wheel comprises a top plate 141, an outer ring wall 142, an inner ring wall 143, a penetration hole 145 formed at the top plate 141, a ring-shaped magnet 146, a plurality of fan blades 147 protruded to the outer ring wall 142, a first accommodating slot 148 formed between the outer ring wall 142 and the top plate 141, and a second accommodating slot 149 formed between the inner ring wall 143 and the top plate 141. Referring to FIGS. 1 and 2, the penetration hole 145 comprises a first opening 145a, a second opening 145b, a channel 145c and an inner diameter B, wherein the inner diameter B of the penetration hole 145 is bigger than the outer diameter A of the fixing pillar 120, and the channel 145c is located between the first opening 145a and the second opening 145b. The top plate 141 comprises a bottom surface 141a and a top surface 141b, the first opening 145a of the penetration hole 145 is located at the bottom surface 141a, and the second opening 145b is located at the top surface 141b. In this embodiment, the penetration hole 145 of the fan wheel 140 further comprises a blocking member 145d protruded to the channel 145c of the penetration hole 145, and the blocking member 145d comprises a center hole 145e having a first inner diameter C. The outer ring wall 142 and the inner ring wall 143 are disposed at the bottom surface 141a of the top plate 141. The inner ring wall 143 is located within the first accommodating slot 148 and surrounds the first opening 145a of the penetration hole 145. The first opening 145a is in communication with the second accommodating slot 149 and the channel 145c. The ring-shaped magnet 146 disposed at the first accommodating slot 148 is coupled to the outer ring wall 142 and corresponded to the stator 130. The bearing 150 disposed at the second accommodating slot 149 comprises an external surface 151, a coupling hole 152 and an internal surface 153, wherein the coupling hole 152 comprises a second inner diameter D, and the first inner diameter C of the center hole 145e is not smaller than the second inner diameter D of the coupling hole 152. The bearing 150 is coupled to the inner ring wall 143 via the external surface 151. With reference to FIGS. 2 and 3, the hollow cylinder body 110 and the stator 130 are covered with the fan wheel 140. The inner ring wall 143 is fitted into the accommodating space 113 of the hollow cylinder body 110. The ring wall 112 of the hollow cylinder body 110 and the stator 130 are located between the outer ring wall 142 and the inner ring wall 143 of the fan wheel 140. With reference to FIG. 2, the heat-dissipation fan 100 further comprises a gasket 180 and a limiting member 190, wherein the fixing pillar 120 is penetrated through the gasket 180. Referring to FIG. 3, the fixing pillar 120 is coupled to the internal surface 153 of the bearing 150 and penetrates through the coupling hole 152 of the bearing 150 and the penetration hole 145. The free end 122 of the fixing pillar 120 is protruded to the top surface 141b of the top plate 141 of the fan wheel 140, wherein the supporting surface 122a of the free end 122 and the top surface 141b of the top plate 141 are spaced apart from each other by a first spacing G1. The gasket 180 is in contact with the bearing 150 and the bottom plate 111 of the hollow cylinder body 110 and located between the bearing 150 and the bottom plate 111. The limiting member 190 is disposed at the free end 122 of the fixing pillar 120. In this embodiment, the limiting member 190 is fitted into the penetration hole 145 of the fan wheel 140 and located on top of the blocking member 145d. An outer diameter E of the limiting member 190 is not smaller than the first inner diameter C of the center hole 145e of the blocking member 145d, which may prevent the fan wheel 140 from falling off the fixing pillar 120. The bearing plate 160 comprises an insertion base 161, an insertion hole 162 located at the insertion base 161 and a vent 163. In this embodiment, the insertion hole 162 and the vent 163 can be through holes, and the hollow cylinder body 110 is fixed at the insertion hole 162. Besides, the lower surface 111b of the bottom plate 111 of the hollow cylinder body 110 comprises a protrusion 111c protruded to bottom of the bearing plate 160 such that the protrusion 111c and the bearing plate 160 are spaced apart from each other by a second spacing G2, and the second spacing G2 is not bigger than the first spacing G1. The circuit board 170 is electrically connected with the stator 130 to drive the fan wheel 140 into rotation. In this embodiment, the circuit board 170 is installed at external edge of the ring wall 112 or installed at the bearing plate 160 for height reduction of the heat-dissipation fan 100.

Figure 4:
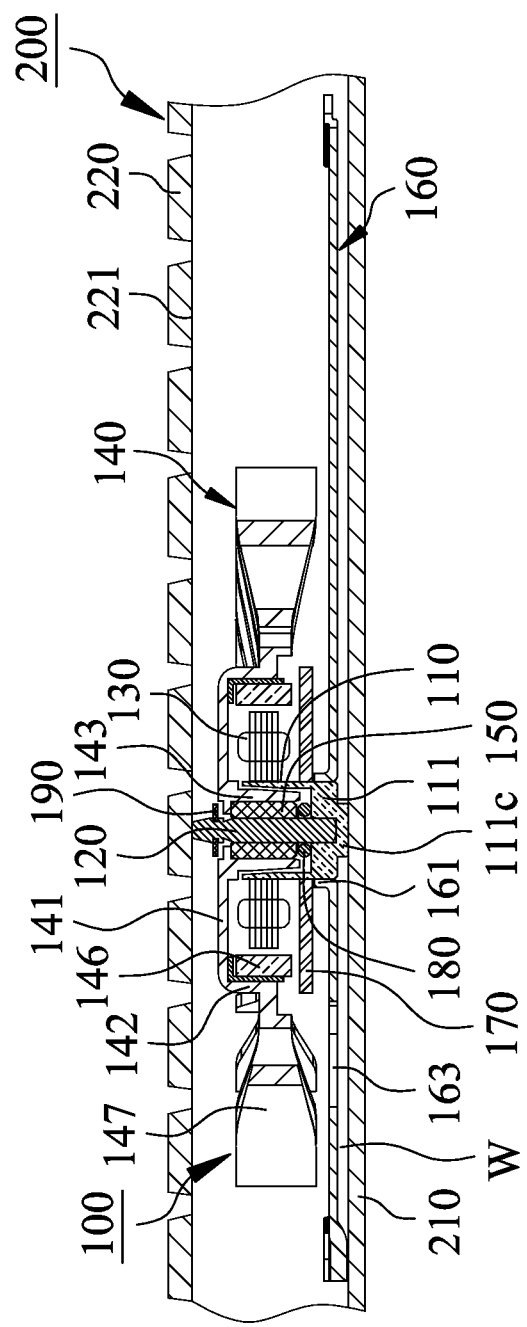
FIG. 4 is a section view illustrating a heat-dissipation fan mounted in a notebook with a first embodiment of the present invention.

The heat-dissipation fan 100 may be disposed between an upper case and a lower case in a notebook or a tablet PC. An embodiment for a heat-dissipation fan 100 installed within a notebook 200 is illustrated in FIG. 4. The heat-dissipation fan 100 is disposed between a bottom case 210 and a keyboard 220, and the fan wheel 140 is actuated to rotate by the stator 130. When a user presses the keyboard 220, a bottom edge 221 of the keyboard 220 is in contact against the supporting surface 122a of the fixing pillar 120 to prevent the keyboard 220 from compressing the top plate 141 and the fan blades 147 of the fan wheel 140. Without protection of the fixing pillar 120, the direct compression force from the keyboard 220 makes the heat-dissipation fan 100 failed to operation. In addition, a heat-dissipation channel W is formed between the vent 163 and the second spacing G2 owing to the reason that the heat-dissipation fan 100 is installed between the bottom case 210 and the keyboard 220 of the notebook 200. An air convection can be formed between the air inside the notebook 200 and the air outside the notebook 200 via the heat-dissipation channel W as long as the heat-dissipation fan 100 rotates, which may effectively reduce the temperature within the notebook 200.

Figure 5:
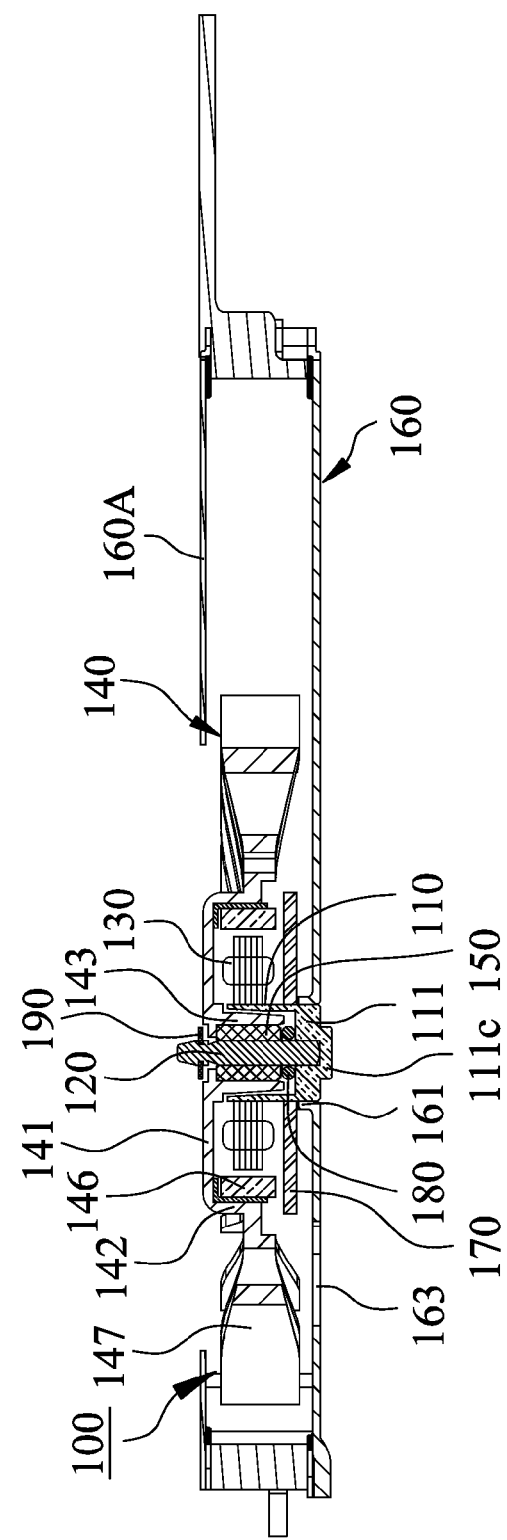
FIG. 5 is a section view illustrating a heat-dissipation fan in accordance with a second embodiment of the present invention.

Referring to FIG. 5, a heat-dissipation fan 100 in accordance with a second embodiment of this invention comprises a hollow cylinder body 110, a fixing pillar 120, a stator 130, a fan wheel 140, a bearing 150, a bearing plate 160, a circuit board 170, a gasket 180 and a limiting member 190. The difference between the second embodiment and the first embodiment is that the heat-dissipation fan 100 further comprises a case 160A, and the free end 122 of the fixing pillar 120 is protruded to the case 160A. The supporting surface 122a of the free end 122 and the case 160A are spaced apart from each other by a third spacing G3, and the third spacing G3 is smaller than the first spacing G1.

Figure 6:
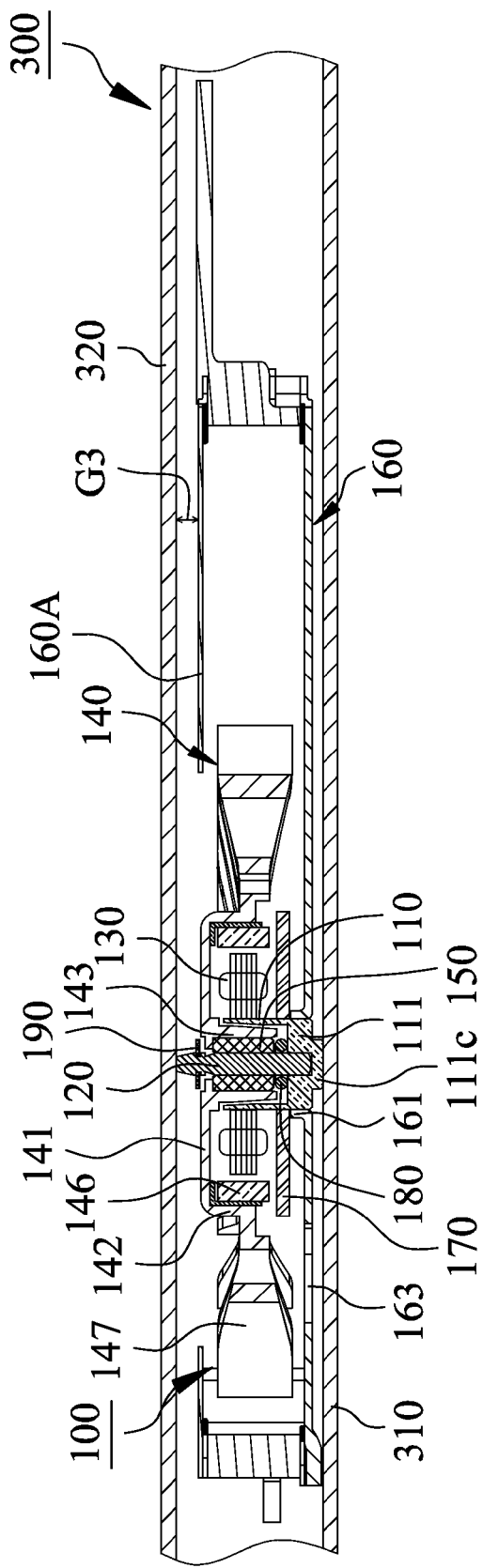
FIG. 6 is a section view illustrating a heat-dissipation fan mounted in a tablet PC with a second embodiment of the present invention.
Figure 7:
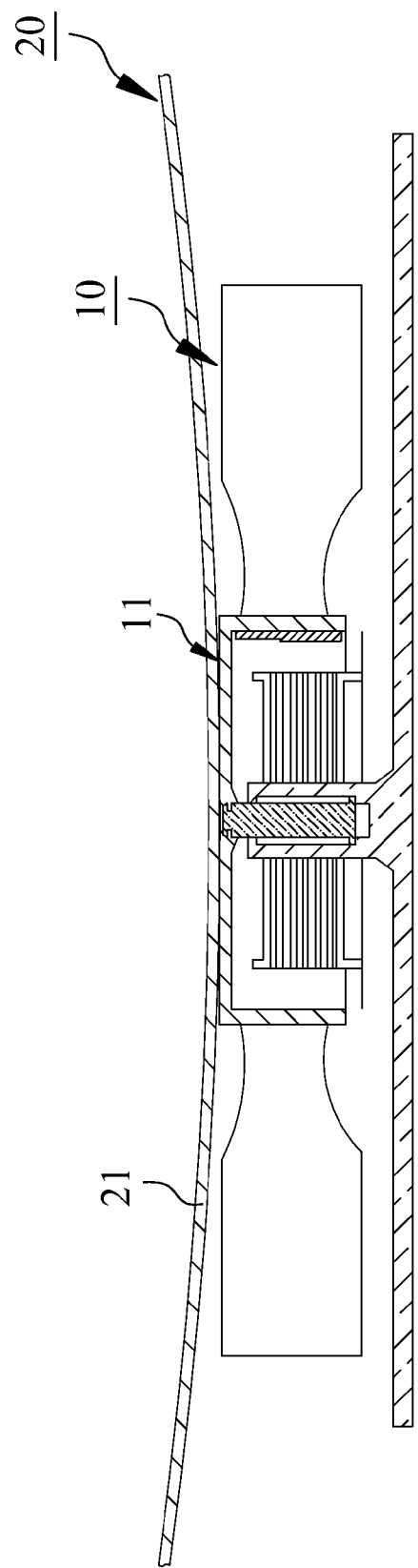
FIG. 7 is a section view illustrating a conventional heat-dissipation fan.

An embodiment for a heat-dissipation fan 100 installed within a tablet PC 300 is illustrated in FIG. 6. The heat-dissipation fan 100 is disposed between a bottom case 310 and a touch panel 320 of the tablet PC 300. When a user presses the touch panel 320, one side of the touch panel 320 is in contact against the supporting surface 122a of the fixing pillar 120 to prevent the touch panel 320 from compressing the case 160A, the top plate 141 and the fan blades 147 of the fan wheel 140. Without protection of the fixing pillar 120, the direct compression force from the touch panel 320 may make the heat-dissipation fan 100 failed to operation.

While this invention has been particularly illustrated and described in detail with respect to the preferred embodiments thereof, it will be clearly understood by those skilled in the art that it is not limited to the specific features and describes and various modifications and changes in form and details may be made without departing from the spirit and scope of this invention.

What is claimed is:
1. A heat-dissipation fan comprising:
a hollow cylinder body having a bottom plate, a ring wall disposed around the bottom plate and an accommodating space formed between the ring wall and the bottom plate;
a fixing pillar having a fixing end and a free end, the fixing end is fixed at the bottom plate of the hollow cylinder body, and wherein the free end protrudes beyond a top surface of the ring wall of the hollow cylinder body and comprises a supporting surface;
a stator installed at the ring wall;
a fan wheel having a top plate, an outer ring wall, an inner ring wall, a penetration hole formed at the top plate, a ring-shaped magnet, a first accommodating slot formed between the outer ring wall and the top plate, and a second accommodating slot formed between the inner ring wall and the top plate, wherein the top plate comprises a bottom surface and a top surface, the outer ring wall and the inner ring wall are disposed at the bottom surface of the top plate, the inner ring wall is located within the first accommodating slot and surrounds the penetration hole, the hollow cylinder body and the stator are covered with the fan wheel, the inner ring wall is fitted into the accommodating space of the hollow cylinder body, the ring wall and the stator are located between the outer ring wall and the inner ring wall;
a bearing disposed within the second accommodating slot, wherein said bearing comprises a coupling hole, the fixing pillar penetrates through the coupling hole and the penetration hole of the fan wheel, wherein the free end of the fixing pillar protrudes beyond the top surface of the top plate, and wherein the supporting surface and the top surface are spaced apart from each other by a first spacing;
a bearing plate having an insertion hole, wherein the hollow cylinder body is fixed at the insertion hole; and
a case, wherein the supporting surface of the free end and the case are spaced apart from each other by a second spacing, wherein the second spacing is smaller than the first spacing.

2. The heat-dissipation fan in accordance with claim 1, wherein the penetration hole comprises a first opening, a second opening and a channel, the inner diameter of the penetration hole is larger than the outer diameter of the fixing pillar, the first opening is located at the bottom surface of the top plate, the second opening is located at the top surface of the top plate, the channel is located between the first opening and the second opening, the first opening is surrounded by the inner ring wall of the fan wheel, and the first opening is in communication with the second accommodating slot and the channel.

3. The heat-dissipation fan in accordance with claim 2, wherein the penetration hole further comprises a blocking member protruded to the channel of the penetration hole.

4. The heat-dissipation fan in accordance with claim 3, wherein the blocking member includes a center hole having a first inner diameter, the coupling hole of the bearing comprises a second inner diameter, and the first inner diameter is not smaller than the second inner diameter.

5. The heat-dissipation fan in accordance with claim 4 further comprises a limiting member disposed at the free end of the fixing pillar, the limiting member is fitted into the penetration hole of the fan wheel and located on top of the blocking member, and the outer diameter of the limiting member is not smaller than the first inner diameter of the center hole.

6. The heat-dissipation fan in accordance with claim 2 further comprises a gasket located between the bearing and the bottom plate of the hollow cylinder body, the fixing pillar penetrates through the gasket, and the gasket is in contact with the bearing.

7. The heat-dissipation fan in accordance with claim 2 further comprises a limiting member disposed at the free end of the fixing pillar.

8. The heat-dissipation fan in accordance with claim 2, wherein the bottom plate of the hollow cylinder body comprises an upper surface and a lower surface, the lower surface comprises a protrusion protruded to the bearing plate, the protrusion and the bearing plate are spaced apart from each other by a third spacing.

9. The heat-dissipation fan in accordance with claim 8, wherein the bearing plate further comprises a vent and a heat-dissipation channel formed between the vent and the third spacing.

10. The heat-dissipation fan in accordance with claim 8, wherein the third spacing is not bigger than the first spacing.

11. The heat-dissipation fan in accordance with claim 2, wherein the bearing plate includes an insertion base, the insertion hole is located at the insertion base.

12. The heat-dissipation fan in accordance with claim 1 further comprises a gasket located between the bearing and the bottom plate of the hollow cylinder body, the fixing pillar penetrates through the gasket, and the gasket is in contact with the bearing.

13. The heat-dissipation fan in accordance with claim 1 further comprises a limiting member disposed at the free end of the fixing pillar.

14. The heat-dissipation fan in accordance with claim 1, wherein the bottom plate of the hollow cylinder body comprises an upper surface and a lower surface, the lower surface comprises a protrusion protruded to the bearing plate, the protrusion and the bearing plate are spaced apart from each other by a third spacing.

15. The heat-dissipation fan in accordance with claim 14, wherein the bearing plate further comprises a vent and a heat-dissipation channel formed between the vent and the third spacing.

16. The heat-dissipation fan in accordance with claim 14, wherein the third spacing is not bigger than the first spacing.

17. The heat-dissipation fan in accordance with claim 1, wherein the bearing plate includes an insertion base, the insertion hole is located at the insertion base.

18. A heat-dissipation fan comprising:
a bearing plate having an insertion hole;
a hollow cylinder body fixed at the insertion hole and having:
a bottom plate comprising an upper surface and a lower surface, wherein the lower surface comprises a protrusion protruded to the bearing plate and wherein the protrusion and the bearing plate are spaced apart from each other by a first spacing,
a ring wall disposed around the bottom plate,
and an accommodating space formed between the ring wall and the bottom plate;
a fixing pillar having a fixing end and a free end, wherein the fixing end is fixed at the bottom plate of the hollow cylinder body, and wherein the free end protrudes beyond a top surface of the ring wall of the hollow cylinder body and comprises a supporting surface;
a stator installed at the ring wall;
a fan wheel having a top plate, an outer ring wall, an inner ring wall, a penetration hole formed at the top plate, a ring-shaped magnet, a first accommodating slot formed between the outer ring wall and the top plate, and a second accommodating slot formed between the inner ring wall and the top plate, wherein the top plate comprises a bottom surface and a top surface, the outer ring wall and the inner ring wall are disposed at the bottom surface of the top plate, the inner ring wall is located within the first accommodating slot and surrounds the penetration hole, the hollow cylinder body and the stator are covered with the fan wheel, the inner ring wall is fitted into the accommodating space of the hollow cylinder body, the ring wall and the stator are located between the outer ring wall and the inner ring wall; and
a bearing disposed within the second accommodating slot, wherein said bearing comprises a coupling hole, the fixing pillar penetrates through the coupling hole and the penetration hole of the fan wheel, wherein the free end of the fixing pillar protrudes beyond the top surface of the top plate, and wherein the supporting surface and the top surface are spaced apart from each other by a second spacing, wherein the first spacing is not bigger than the second spacing.

19. A heat-dissipation fan comprising:
a bearing plate having an insertion hole,
a hollow cylinder body fixed at the insertion hole and having
a bottom plate with an upper surface and a lower surface, where the lower surface comprises a protrusion protruded to the bearing plate and the protrusion and the bearing plate are spaced apart from each other by a first spacing,
a ring wall disposed around the bottom plate, and an accommodating space formed between the ring wall and the bottom plate;

a fixing pillar having a fixing end and a free end, wherein the fixing end is fixed at the bottom plate of the hollow cylinder body, and wherein the free end protrudes beyond a top surface of the ring wall of the hollow cylinder body and comprises a supporting surface;

a stator installed at the ring wall;

a fan wheel having:
- a top plate,
- an outer ring wall,
- an inner ring wall,
- a penetration hole formed at the top plate and comprising a first opening, a second opening and a channel, wherein an inner diameter of the penetration hole is larger than an outer diameter of the fixing pillar, the first opening is located at a bottom surface of the top plate, the second opening is located at a top surface of the top plate, the channel is located between the first opening and the second opening, and the first opening is surrounded by the inner ring wall of the fan wheel,
- a ring-shaped magnet,
- a first accommodating slot formed between the outer ring wall and the top plate, and
- a second accommodating slot formed between the inner ring wall and the top plate such that the first opening is in communication with the second accommodating slot and the channel and wherein the outer ring wall and the inner ring wall are disposed at the bottom surface of the top plate, the inner ring wall is located within the first accommodating slot and surrounds the penetration hole, the hollow cylinder body and the stator are covered with the fan wheel, the inner ring wall is fitted into the accommodating space of the hollow cylinder body, and the ring wall and the stator are located between the outer ring wall and the inner ring wall; and a bearing disposed within the second accommodating slot, wherein said bearing comprises a coupling hole, the fixing pillar penetrates through the coupling hole and the penetration hole of the fan wheel, wherein the free end of the fixing pillar protrudes beyond the top surface of the top plate, and wherein the supporting surface and the top surface are spaced apart from each other by a second spacing wherein the first spacing is not bigger than the second spacing.

* * * * *